United States Patent [19]  
Haley

[11] 3,892,978  
[45] July 1, 1975

[54] APPARATUS AND METHOD FOR AUTOMATICALLY GUIDING A DRIVEN GENERATOR INTO SYNCHRONIZATION WITH A POWER SYSTEM

[75] Inventor: Paul H. Haley, Pittsburgh, Pa.

[73] Assignee: Westinghouse Electric Corp., Pittsburgh, Pa.

[22] Filed: Apr. 26, 1974

[21] Appl. No.: 464,609

[52] U.S. Cl. .............................. 307/87; 290/40 A
[51] Int. Cl. ............................................ H02j 3/42
[58] Field of Search ......... 307/87; 290/40 A; 317/5, 317/6; 324/162; 322/19, 20; 235/151.21

[56] References Cited
UNITED STATES PATENTS

| | | |
|---|---|---|
| 2,932,782 | 4/1960 | Newbold et al. .................... 322/19 |
| 3,110,817 | 11/1963 | Frederick .............................. 322/19 |
| 3,794,846 | 2/1974 | Schlicher et al. ...................... 307/87 |
| 3,829,704 | 8/1974 | Marbukh et al. ............. 290/40 A X |

Primary Examiner—Robert K. Schaefer
Assistant Examiner—William J. Smith
Attorney, Agent, or Firm—S. A. Seinberg

[57] ABSTRACT

A control system is disclosed for synchronizing a gas turbine driven generator to an external power system with minimal modulation and fuel flow to the turbine. By predetermined model reference fuel flow control, the trajectory of turbine velocity and angular position is guided so that synchronous speed and permissible phase angle difference required for synchronization are obtained simultaneously.

6 Claims, 4 Drawing Figures

APPARATUS AND METHOD FOR AUTOMATICALLY GUIDING A DRIVEN GENERATOR INTO SYNCHRONIZATION WITH A POWER SYSTEM

CROSS-REFERENCE TO RELATED APPLICATIONS

Reference is hereby made to the following commonly assigned and related applications: U.S. Pat. application Ser. No. 319,114, filed on Nov. 29, 1972 in the names of J. F. Reuther and T. C. Giras and entitled "Improved system and Method For Operating Industrial Gas Turbine Apparatus And Gas Turbine Electric Power Plants Preferably With A Digital Computer Control System"; U.S. Pat. application Ser. No. 276,343, filed on July 31, 1972 in the name of T. Reed and entitled "System And Method Employing A Digital Computer With Improved Programmed Operation For Automatically Synchronizing A Gas Turbine Or Other Electric Plant Generator With A Power System"; and U.S. Pat. application Ser. No. 276,508, filed on July 31, 1972 in the name of J. F. Reuther and entitled "System And Method Employing A Digital Computer For Automatically Synchronizing A Gas Turbine Or Other Electric Power Plant Generator With A Power System".

BACKGROUND OF THE INVENTION

1. Field Of The Invention

This invention relates to a method and apparatus for synchronizing a driven electrical power generator with an external power system and, more particularly, to the guided synchronization thereof so that synchronous speed and the proper phase angle required for synchronization are obtained simultaneously and relatively rapidly without need of fuel flow modulation.

2. Description Of The Prior Art

In the operation of an electric power plant, the prime mover for each plant generator is typically a steam or gas turbine which is controlled in its operation to drive an electric generator from rest or turning gear speed to the generator running speed. The control system utilized may be an electro-hydraulic or an electro-pneumatic system employing an analog and/or digital electronic control or a digital computer control. If the electric power plant is included in a power system to which it will contribute power for distribution to various user points, a breaker is operated to connect the generator to the system when the generator acquires the proper operating status for synchronization.

It is generally required in order to effect synchronization that the generator speed be within a predefined range to provide for substantial matching of the generator electrical frequency and the power system electrical frequency, that the generator voltage magnitude be within a predefined range to provide for substantial matching of the generator and power system voltage magnitudes, and that the phase difference between the generator voltage waveform and the power system voltage waveform be approaching zero for breaker closure substantially at the zero or coincident phase relationship between the two waveforms. The synchronization conditions just described are needed to avoid generator damage and to avoid serious electrical disturbances in the external power system. It is desirable that the synchronization conditions be satisfied accurately and reliably for equipment protection and power system security purposes. Further, it is desirable that generator and breaker operation be controlled to provide for rapid synchronization, especially in gas turbine and other electric power plants where fast start-up is needed to provide rapid power contribution to the external power system for security purposes against power outage. The combination of start-up reliability and synchronization speed and achievement is a measure of power plant availability for power generation, which is especially significant in relation to gas turbine and other standby electric power plants.

The recent heavy emphasis in the electrical utility industry on the use of gas turbine driven generators for peaking and power system backup has accentuated the need for rapid synchronization capabilities. Obviously, the utility of such gas turbines generating units is enhanced when they can be placed on line in a shorter period of time than is presently possible.

One conventional synchronizing scheme is that relying principally on manual operations or intervention. Thus, a skilled plant operator, who typically will enjoy a synchroscope or like device which provides a visual indication of the degree of phase difference and the slip or rate of change of phase difference between the generator and system bus or line voltages, will make a manual correction to raise or lower speed as required. Concurrently, the operator makes any generator voltage regulation adjustments required for voltage matching. When the generator ultimately reaches synchronization status in response to the manual control, the operator initiates a breaker close signal which then operates a breaker closing relay coil. In practice, the operator generally anticipates the breaker closing time to provide for breaker closure as the two voltage waveforms approach phase coincidence or at the time point of phase coincidence.

In other prior art applications, automatic power plant generator synchronization has also been provided with varying degrees of automation and with varying kinds of hardware combinations. One scheme has involved the use of separate relay controls for the voltage matching, speed matching and synchronization functions. More recently, solid state, automatic synchronization systems have been developed to provide substantial improvements over the earlier prior art relative to certain characteristics which include synchronization accuracy and synchronization speed. The aforementioned patent applications pertain to such systems. In addition, a September, 1968 *Westinghouse Engineer* article entitled "Generator Synchronized Rapidly And Accurately By Automatic System" is also related to the same subject matter area. It is noteworthy at this point to appreciate that in referencing prior art publications or patents or patent applications as background herein, no representation is made that the cited subject matter is the best available prior art. Background information relative to gas turbine electric power plants also pertains to certain aspects of the present invention. However, such background information is more fully considered and discussed in the aforementioned copending application, Ser. No. 319,114, filed in the names of J. F. Reuther and T. C. Giras.

In addition to the existing automatic synchronization systems which are hard wired, other schemes have been developed wherein computer implemented controls have yielded particularly significant improvements in gas turbine power plants where automatic remote operation and high availability are rather desirable. The aforementioned U.S. Pat. application Ser. Nos. 276,343 and 276,508 filed in the names of T. Reed and J. F. Reuther, respectively, disclosed improved apparatus and methods for automatic power plant synchronization with digital computer control implementation.

The need for rapid synchronization capability, regardless of the control system implementation employed in a particular power plant, for peaking and system protection, is clearly recognized in the art. While relatively rapid synchronization can be achieved, the continued reduction of the time required to synchronize a gas turbine driven generator is all the more desired in the current situation of brownouts, reduced operating voltages and outages. Thus, where it is possible to bring a gas turbine driven generator to synchronous speed in from two to five minutes from a cold start, it is obvious that even a slight reduction in this time span will enhance the utility of gas turbine power plants as a source of quickly available power. In addition, if a control system were available which could drive a generator to synchronization more rapidly with little or no fuel modulation, there would also be a saving in fuel as well as a reduction in thermal stresses in the turbine blades since a guided drive to synchronization will eliminate or significantly reduce any hunting about the final synchronization point.

SUMMARY OF THE INVENTION

An electric power plant is provided having a generator which is driven by a prime mover to generate electricity for transmission to an external power system via a circuit breaker. Plant start-up and running operation is controlled by a control system which may include a programmed digital control computer or, in the alternative, may include a hard wired control system, or hybrid version thereof. During start-up or after breaker trip or after isolated plant operation, the control system accurately, reliably, rapidly and efficiently operates to guide the generator towards synchronization so that the proper phase angle is achieved as the prime mover is accelerated to synchronous speed. The guiding of the prime mover so that synchronous speed and the proper phase angle are simultaneously achieved is accomplished herein by use of a model reference feedback control. By appropriate choice of constant acceleration for the prime mover, the model feedback control will cause the generator to be driven directly from a predetermined velocity to the point of synchronization.

DESCRIPTION OF THE PREFERRED EMBODIMENT

Figure 1:
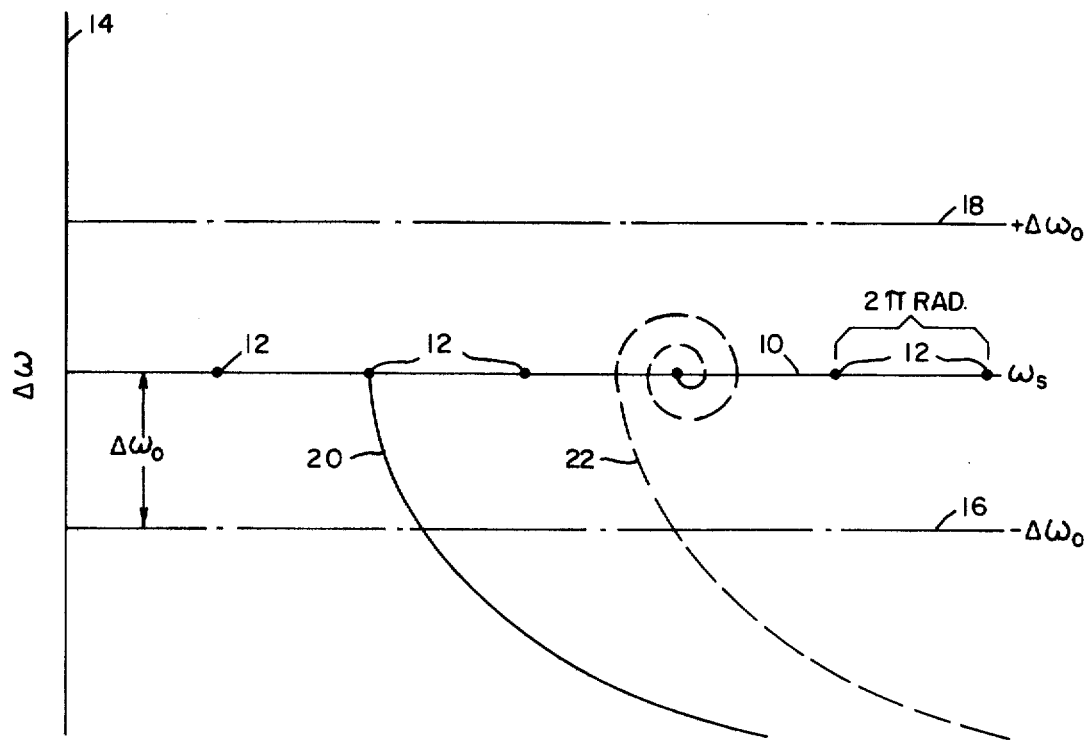
FIG. 1 shows a graphical illustration of a phase-plane diagram wherein synchronization in accordance with the present invention is achieved.

Referring now to the drawings wherein like reference numerals have been used in the several views to identify like elements, FIG. 1 illustrates a graphical representation of a phase plane diagram wherein synchronization with and without assistance of the present invention is depicted. In FIG. 1, the abscissa 10, represents $\omega_s$, the synchronization speed or angular velocity to be reached by a driven generator (not shown) under control of the present invention. The points 12, equally separated by a distance of $2\pi$ radians along the abscissa 10, represent those points during revolution of the generator at which the differential angle or phase difference between the generator and the power system with which it is to be synchronized is zero. The ordinate 14 represents the differential angular velocity $\Delta\omega$, the difference between the angular velocity of the turbine driving the generator to be synchronized and $\omega_s$, the synchronization speed to be reached.

It is assumed for purposes of this description that an electrical power plant having a gas turbine generator and a control system therefore is provided. Typically, such a power plant may be of the type disclosed in the above-identified U.S. Pat. application Ser. Nos. 276,343 and 276,508, the disclosures of which are hereby incorporated by reference. In connection with such a power plant, it will be understood that the control thereof in the context of this description will not be sufficient to achieve synchronization. Instead, model reference feedback is uniquely employed as a means of controlling the acceleration of the turbine, such that the phase angle and speed are reached substantially simultaneously.

Defining $\Delta\theta_T$ as the difference in shaft angle between the generator to be synchronized and one already synchronized to the line of an external power system, $$\Delta\theta_T = 1/2 \ \alpha \ T \ (t_s-t)^2,$$

where $t_s$ is the time of synchronization and $\alpha_T$ is the turbine acceleration. Similarly, $\Delta\omega_T$, the differential angular velocity, is, $$\Delta\omega_T = - \alpha_T \ (t_s-t).$$

If $\Delta\theta_T$ and $\Delta\omega_T$ equal zero at time $t = t_s$, then under constant acceleration, $$2 \ \alpha_T \ (\Delta\theta_T) = (\Delta\omega_T)^2.$$

For a constant acceleration $\alpha_T$, chosen to satisfy the relation expressed above, the differential angle $\Delta\theta_T$ and velocity $\Delta\omega_T$ will be guided or made to pass through zero simultaneously to thereby facilitate and achieve synchronization with only very small or no transients.

Figure 2:
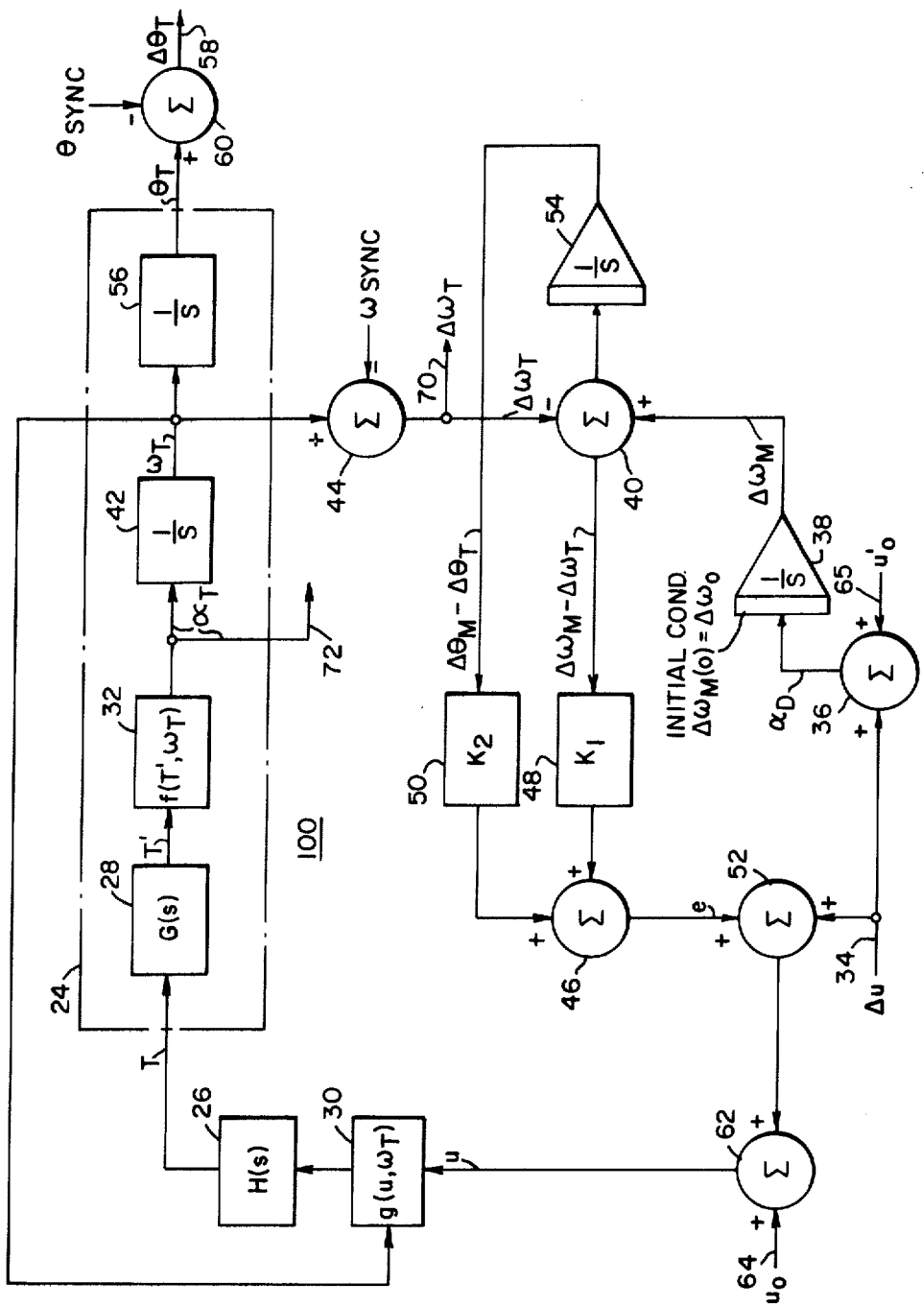
FIG. 2 illustrates a block diagram embodiment of the present invention wherein model reference feedback control is utilized to achieve rapid synchronization.

In the block diagram shown in FIG. 2, the turbine-generator dynamics are represented within the dashed outline of block 24, the actual turbine acceleration $\alpha_T$ appearing at the output of element 32. The illustrated controller consists of a transfer function block 26 or H(s) chosen to cancel the fast dynamics associated with the turbine fuel valve (not shown) and its combustor element (not shown). For s, the Laplace transform variable, $$H(s) = 1/G(s) \text{ for } |s| \leq s_0,$$

where $s_0$ is determined by physical realizability constants and G(s), block 28, represents a linearized description of the fuel valve and combustor dynamics about synchronous speed and a nominal accelerating power $g(u,\omega_T)$ or block 30 is a function selected to cancel the effect of speed on acceleration for a constant fuel valve position and to compensate for nonlinear effects between fuel valve position and acceleration.

Thus, if $f(T',\omega_T)$ or block 32 is the steady state torque or equivalent acceleration produced for a fuel valve position T and turbine speed $\omega_T$, then $g(u, \omega_T)$ or block 30 satisfies $$f[g(u,\omega_T), \omega_T] = u.$$

Thus, the turbine acceleration $\alpha_T$ is a linear function of the signal $u$, the input to the fuel valve controller, with negligible dynamics.

By use of the model reference feedback controller 100 illustrated in FIG. 2, a desired constant acceleration $\alpha_D$, based on measurements of differential speed $\Delta\omega_T$ and phase $\Delta\theta_T$, is computed, as will be hereinafter explained in greater detail, when the turbine reaches a predetermined speed differential $\Delta\omega_o$. As shown in FIG. 1, $\Delta\omega_o$, reference numerals 16 and 18, can be reached or approached respectively from either side of $\omega_s$, the synchronous speed. Most often however, the $\Delta\omega_o$ value depicted by the dashed line 16 will represent the initiating value for use in the present invention.

$u_o$ is the signal which corresponds to the initial normalized turbine acceleration, i.e. — the fuel valve positioning signal applied via input line 64 which results in $\alpha_T$. $u'_o$ is the signal fed to the model via input line 65 which corresponds to $u_o$. $\Delta u$ is the signal applied to both the fuel value of the turbine and to the model via input line 34 and corresponds to the total signal required to accelerate the turbine at $\alpha_D$.

A signal correction in fuel valve position necessary to obtain the constant desired acceleration is applied to the turbine valve value and to the controller via input line 34. $\Delta u$ is applied via summers 52 and 62 to the fuel valve to cause a change in fuel flow and a concomitant chance in acceleration to drive $\alpha_T$ to $\alpha_D$. This signal is also summed in element 36 with the signal $u'_o$, the initial noramlized model acceleration ($u'_o = \alpha_D - \Delta u$) to form $\alpha_D$. The output of summer 36 is fed to integrator 38, which initially is conditioned or set so that $\Delta\omega_o$, the predetermined speed differential at which the model controller takes over, is equal to $\Delta\omega_M(o)$, the differential model velocity at that time. The output of integrator 38, $\Delta\omega_M$ is the desired trajectory of the differential speed. $\Delta\omega_M$ is graphically represented in FIG. 1 by the curve 20 which terminates smoothly at a synchronization point on the abscissa 10. Also shown for comparative purposes is the unguided trajectory or dashed line 22 which represents synchronization achieved without use of the present invention. The terminal oscillatory portion of the unguided trajectory 22 is caused by fuel modulation as a point of synchronization is approached. The differences between the two trajectories is consequently noteworthy.

The signal representing $\Delta\omega_M$ is then fed to summer 40 when it is comparatively summed with $\Delta\omega_T$. $\Delta\omega_T$ is developed by integrating $\alpha_T$, the turbine acceleration, in integrator 42, and then comparatively summing it with the synchronous speed, $\omega_s$, in summer 44. The resultant signal $\omega_T - \omega_s$, which equals $\Delta\omega_T$, is fed to summer 40. $\omega_s$ can be either a fixed reference signal developed in a potentiometer (not shown) or a signal represenative of the speed of a generator already synchronized to the line.

The output signal from summer 40, $\Delta\omega_M - \Delta\omega_T$, is fed to summer 46 via element 48 wherein it is proportionally adjusted. This signal is also fed to integrator 54 to form $\Delta\theta_M - \Delta\theta_T$, which signal is proportionally adjusted by element 50 and then fed to the summer 46 for summation with the output of element 48. The output of summer 46 represents an error feedback signal $e$. If the turbine accelerates in accordance with the trajectory prescribed by the model controller 100, then $e$ is zero. In this manner, by initially setting integrators 38 and 54 to $\Delta\omega_o$ and zero respectively, the model feedback section of controller 100 is made to accelerate as the turbine and tracks its performance as it does so. $K_1$ and $K_2$, the constants of proportional elements 48 and 50, and selected for stability purposes as calculable values which dampen otherwise possible oscillatory excursions caused by the feedback error signal $e$ on the trajectory 20 shown in FIG. 1.

If $e$ is not zero, then $\alpha_D$ is not equal to $\alpha_T$, and the error signal is applied to summer 52 where it is added to $\Delta u$, the initially applied acceleration correction signal. This incremental change in u causes a corresponding change in $\alpha_T$ and subsequently brings $\alpha_T$ to $\alpha_D$ and $e$ to zero. Elements 38, 40, 46, 48, 50, 52 and 54 comprise the model feedback section of controller 100.

Figure 3:
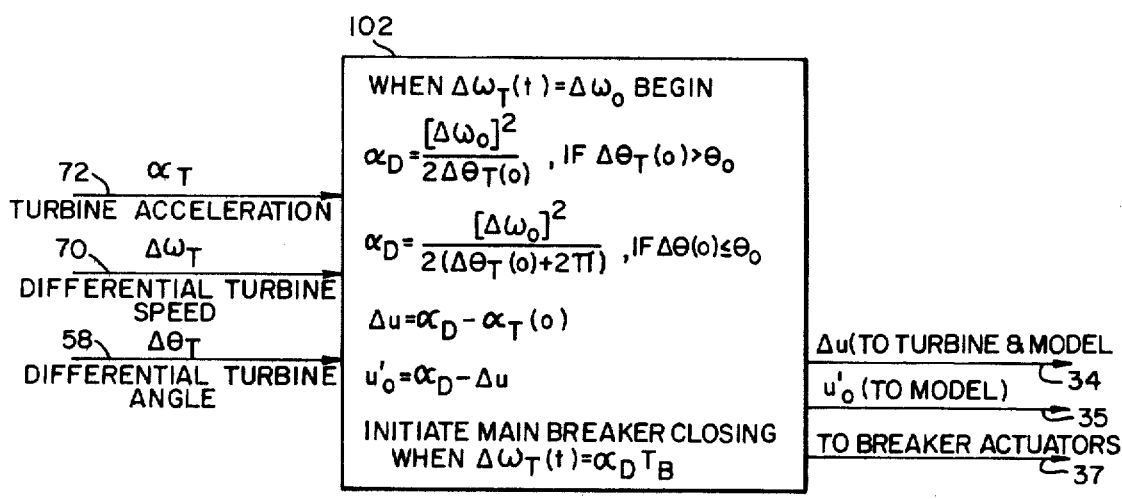
FIG. 3 depicts the signal generation requirements and equations necessary to effect synchronization control in accordance with the present environment.

FIG. 3 illustrates the signal generation requirements and equations of Section 102 of controller 100 wherein the signals needed for operation thereof are developed. It will be understood that while an analog implementation of the logic requirements is illustrated in FIG. 4, such implementation can also be readily achieved, and is within the ordinary skill of a control designer familiarized with turbine control, by digital or software techniques or a hybridization thereof.

The three input signals to Section 102, $\alpha_T$, $\Delta\omega_T$ and $\Delta\theta_T$ are developed in the model controller as shown in FIG. 2 and fed via lines 72, 70 and 58 respectively thereto. $\alpha_T$, the angular turbine acceleration, is taken directly from the output of element 32. $\Delta\omega_T$ is developed by integration and comparative summation as described above. $\Delta\theta_T$ is developed by integrating $\omega_T$ in integrator 56 and then comparatively summing the resultant signal $\theta_T$ in summing element 60 with $\theta_s$, the angular displacement or position or a synchronized generator or a reference signal representative thereof.

Figure 4:
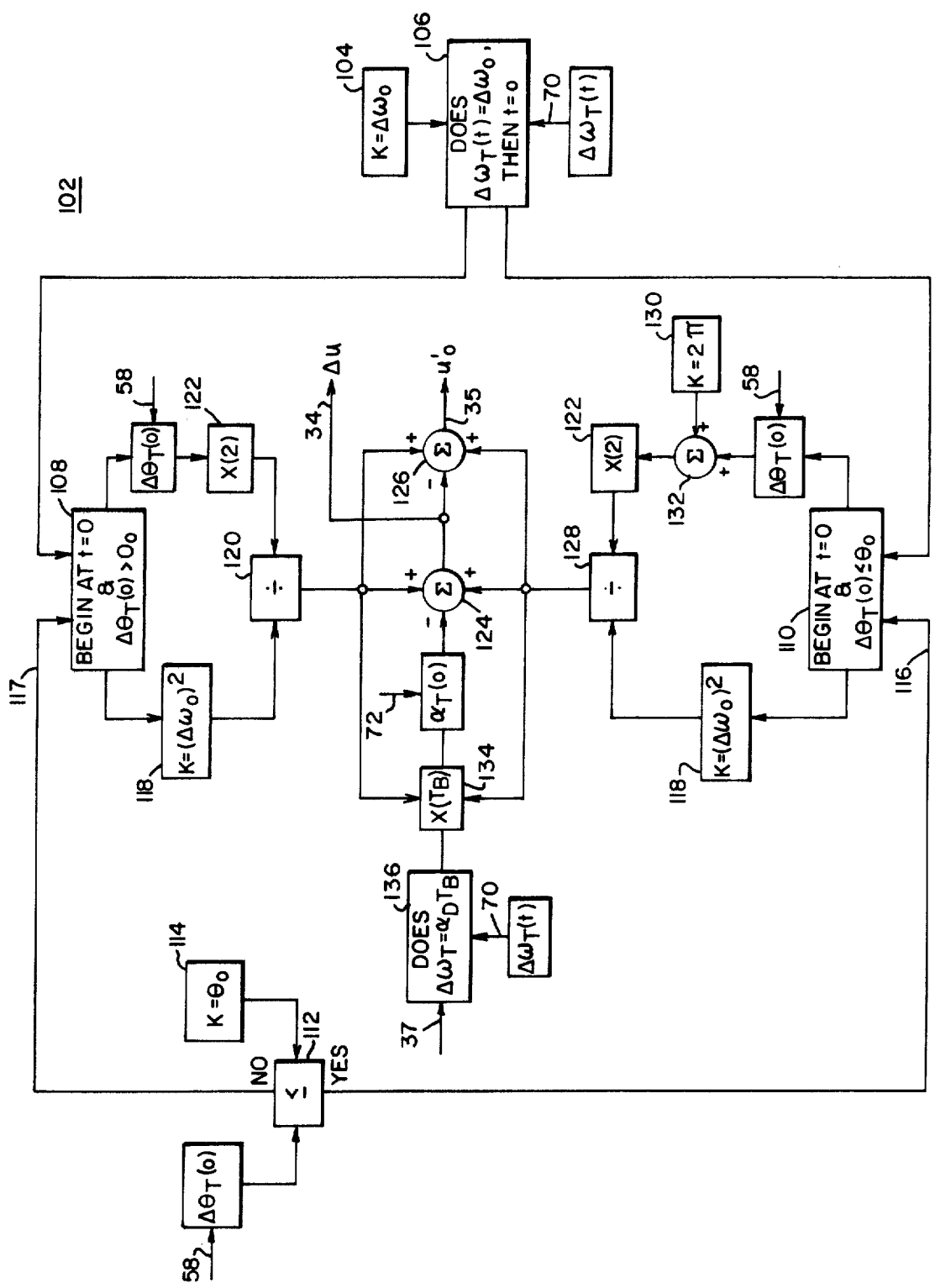
FIG. 4 is a schematic representing illustration the implementation of the FIG. 3 drawing.

As schematically illustrated in FIG. 4, the three output signals from Section 102 are developed in the following manner. $\Delta\omega_o$, a predetermined constant and typically 90% of the value of $\omega_s$, is developed or set in element 104 $\Delta\omega_T(t)$, the velocity differential, is fed via line 70 to comparator 106 where it is compared to $\Delta\omega_o$. When these two signals are equal (at $t = 0$, the initializing point,) an authorizing or begin signal is forwarded to the gating elements 108 and 110. One, and only one, of these elements has already been primed by the decisional or selecting element 112.

Decisional element 112 is fed the values of $\Delta\theta_T$ via input line 58, which value represents $\Delta\theta_T(0)$ at $t = 0$, and the constant $\theta_o$, which is developed or set in block 114, $\theta_o$ is a predetermined angle chosen to minimize variations in the desired acceleration about the initial acceleration. Element 112, after comparing the two input signals thereto, decides whether $\Delta\theta_T(0)$ is smaller than or equal to $\theta_o$. If the decision is affirmative, then gating element 110 is primed by an appropriate signal at its input 116. If $\Delta\theta_T(0)$ is larger than $\theta_o$, then gating element 108 instead is similarly primed via its input 117. Thus, at $t = 0$ or when $\Delta\omega_T(t) = \Delta\omega_o$, either gating element 108 or 110 will begin the logical development of the output signals from Section 102. By utilizing the foregoing decisional format, synchronization at the next possible or projected point (see FIG. 1) is insured.

Assuming first that gating element 108 has been primed or actuated, the constant $(\Delta\omega_o)^2$, developed in element 118, is forwarded to dividing element 120. At the same time, the sensed value of $\Delta\theta_T$ at $t = 0$ is fed to multiplier 122 where it is doubled and then fed to dividing element 120. The value of $(\Delta\omega_o)^2/2 \Delta\theta_T(0)$ or $\alpha_D$ is then passed to summer 124. Since only gating element 108 has been actuated, the only other live input to summer 124 is the value of $\alpha_T$ at $t = 0$. The difference of these values or $\alpha_D - \alpha_T(o)$ is equal to $\Delta u$ which appears on output line 34. $\Delta u$ is also fed to summer 126 where it is subtracted from $\alpha_D$ to form $\alpha_D - \Delta u$ or $u_o'$, the initial normalized model acceleration. This quantity is outputed on line 35.

If gating element 110 rather than 108 had been actuated then $\alpha_D$ is developed on the output of dividing element 128 in a similar manner as it was developed on the output of dividing element 120. The difference between the two occurs with respect to the development of the denominator of $\alpha_D$ in that after $\Delta\theta_T(0)$ has been formed it is added in summar 132 to the constant $2\pi$, developed in element 130. After the value of $\alpha_D$ has been generated, the values of $\Delta u$ and $u_o'$ are developed in the same manner as described above.

After being generated by the initiating actuation of either gating elements 108 or 110, the value of $\alpha_D$ is fed to multiplier 134 where it is multiplied by the constant value $T_B$. From there, the resultant product signal $_DT_B$ is compared to $\Delta\omega_T(t)$ in comparator 136. When $\Delta\omega_T(t) = \alpha_D T_B$, a breaker actuation signal is generated and appears on output line 37. $T_B$ is a predetermined constant value selected to compensate for the time required from initiation of breaker action to its completion at the correct point in time to effect synchronization of the guided generator to and with the external power system.

The various symbols for the constants and variables noted above and/or in the drawings have been set forth below together with a short description thereof in Table I:

TABLE I

LIST OF VARIABLES AND COMPONENTS

| | |
|---|---|
| $T_B$ | Breaker closing time |
| $T$ | Fuel valve position |
| $T'$ | Effective fuel valve position |
| $\alpha_T$ | Angular acceleration of turbine |
| $\omega_T$ | Angular velocity of turbine |
| $\theta_T$ | Angular position of turbine |
| $\omega_{SYNC}$ | Angular velocity of synchronous generator |
| $\theta_{SYNC}$ | Angular position of synchronous generator |
| $\Delta\omega_T$ | $\omega_{SYNC} - \omega_T$ differential turbine speed |
| $\Delta\theta_T$ | $\theta_{SYNC} - \theta_T$ differential turbine angle |
| $\Delta\omega_M$ | Differential model velocity |
| $\Delta\theta_M$ | Model differential angle |
| $u_o$ | Initial normalized turbine acceleration |
| $u$ | Input to fuel valve controller |
| $\Delta u$ | Normalized acceleration correction |
| $u_o'$ | Initial normalized model acceleration |
| $e$ | Error acceleration signal |
| $\alpha_D$ | Desired synchronizing acceleration |
| $f(T', \omega_T)$ | Normalized steady state torque as a function of turbine velocity and effective fuel valve position |
| $G(s)$ | Linearized combustor and fuel valve dynamics relating fuel valve position to effective valve position at synchronous speed and nominal acceleration power |
| $H(s)$ | Controller synamics. $H(s) = 1/G(s)$ for $s_v$ |
| $g(u, \omega_T)$ | Nonlinear compensation chosen such that $u = f[g(u, \omega_T), \omega_T]$ |
| $K_1$ | Velocity error feedback coefficient |
| $K_2$ | Position error feedback coefficient |
| $\theta_o$ | Angle chosen to minimize variations in desired acceleration about initial acceleration |
| $\Delta\omega_o$ | Turbine differential velocity determining start of synchronizing feedback control |

By analog implementation of the above-described synchronization guide controller, the enumerated steps can be carried out rather quickly, accurately and economically. Thus, when $\Delta\omega_T(t) = \Delta\omega_o$, automatic guidance of the turbine driven trajectory is initiated to control its acceleration so that it simultaneously attains $\Delta\theta_T(t) = 0$ and $\Delta\omega_T(t) = 0$.

It should be noted that guided synchonization of the turbine and generator can be accomplished without use of the model reference feedback control section of controller 100. In such a case, the velocity trajectory 20 (see FIG. 1) will not be as smooth as shown. However, automatic guided synchronization will still be achieved.

From the foregoing description, it is apparent that the present invention provides a novel means and method of quickly guiding a gas turbine driven generator into synchronization with an external power system with minimal or on fuel flow modulation. Although only one embodiment of the invention has been described and shown with particularity, it will be understood that changes therein may be made by those having ordinary skill without departing from the spirit and scope thereof. Consequently, the present invention is not intended to be limited to the precise embodiment described and shown herein, except as limited by any pertinent prior art.

I claim:

1. In an electric power plant having a gas turbine driven generator, a control system for operating the turbine and, in particular, for controlling the fuel flow thereto, and a breaker system for connecting the generator to an external power system, apparatus for automatically guiding the generator into synchronization with the external power system, said apparatus comprising:

a. means for sensing at an initializing point when the turbine has reached a predetermined angular velocity which is different than the angular velocity at synchronization;

b. means for determining, responsive to said means for sensing and actuable thereby, a constant acceleration value which will cause any difference in phase angle and angular velocity of the generator at the initializing point and at a projected point of synchronization to simultaneously reach zero;

c. means for generating a control signal comensurate with said determined constant acceleration value and for applying said control signal to the turbine fuel flow control to cause it to accelerate at said determined constant value; and d. means for generating a breaker actuation signal, coupled to the breaker, when the angular velocity of the turbine becomes equal to the product of said determined constant acceleration value and the time required to close the breaker.

2. The apparatus according to claim 1 which further comprises:

a. first integrating means, initialized at said predetermined angular velocity;

b. first summing means, connected to the input of said first integrating means and adapted to receive all signals applied to the turbine fuel flow control, for summing all of such received signals;

c. means for sensing the difference between the angular velocity of the turbine and the required angular velocity at synchronization and for outputting a singal representative of said sensed difference;

d. second summing means, connected between the output of said sensing means and said first integrating means for subtracting said sensed difference from the output of said first integrating means to produce a first error signal; and e. third summing means, the inputs of which are connected to said second summing means and said means for generating said control signal and the output of which is connected to the turbine fuel flow control, for summing said control signal and said first error signal as an input to the turbine fuel flow control.

3. The apparatus according to claim 2 which further comprises second integrating means, initialized at zero, for generating a second error signal and connected between said second and third summing means.

4. The apparatus according to claim 3 which further comprises first and second proportional elements for respectively adjusting said first and second error signals for stability purposes, said first proportional element being connected between said second and third summing means and said second proportional element being connected between said second integrating means and said third summing means.

5. A method for guiding a gas turbine driven generator into synchronization with an external power system by means of an actuable breaker, said method comprising the steps of:

a. accelerating the turbine and the generator to a predetermined angular velocity which is different than the angular velocity at synchronization;

b. determining at an initializing point when the predetermined angular velocity has been reached;

c. selecting a value of constant acceleration for the turbine and the generator at the initializing point, which constant acceleration value will cause any differences in phase angle angle angular velocity of the generator at the initializing point and at a projected point of synchronization to simultaneously reach zero;

d. applying a control signal commensurate with the determined value of constant acceleration to the fuel flow control of the gas turbine to cause it to accelerate at the determined constant value; and then e. actuating the breaker in sufficient time to connect the generator to the external power system as the differences in phase angle and angular velocity of the generator at the initializing point and at the projected point of synchronization reach zero.

6. The method according to claim 5 which comprises the additional steps of:

a. assembling a model of the turbine, which model is accelerated at the determined value of constant acceleration;

b. tracking the differences in phase angle and angular velocity of the model and the turbine;

c. generating an error signal proportional to any phase angle or angular velocity differences; and then d. applying the error signal to the fuel flow control of the gas turbine to correct the previously applied control signal.

* * * * *